United States Patent [19]

Fielding

[11] Patent Number: 5,267,636
[45] Date of Patent: Dec. 7, 1993

[54] SYNCHRONIZER SLIDING CLUTCH SLEEVE

[75] Inventor: Alan J. Fielding, Radcliffe, England

[73] Assignee: Eaton Corporation, Cleveland, Ohio

[21] Appl. No.: 858,463

[22] Filed: Mar. 27, 1992

[30] Foreign Application Priority Data

Apr. 12, 1991 [GB] United Kingdom ............... 9107771

[51] Int. Cl.⁵ .............................................. F16D 23/06
[52] U.S. Cl. ................. 192/53 F; 192/114 R; 192/53 G; 74/339
[58] Field of Search ................. 192/53 E, 53 F, 53 G, 192/114 R; 74/339

[56] References Cited

U.S. PATENT DOCUMENTS

| | | | |
|---|---|---|---|
| 2,085,019 | 6/1937 | Griswold | 192/53 G |
| 2,478,355 | 8/1949 | Auten | 192/53 F |
| 2,495,411 | 1/1950 | Frost | 192/53 F |
| 2,547,732 | 4/1951 | Baker | 192/53 G |
| 3,086,633 | 4/1963 | Winter | 192/53 F |
| 4,059,178 | 11/1977 | Magg et al. | 192/53 F |
| 4,185,725 | 1/1980 | Maina | 192/53 F |

FOREIGN PATENT DOCUMENTS

| | | | |
|---|---|---|---|
| 157725 | 12/1982 | German Democratic Rep. | 192/53 F |
| 1012389 | 12/1965 | United Kingdom | 192/53 F |
| 2029519 | 3/1980 | United Kingdom | |

Primary Examiner—Richard M. Lorence
Attorney, Agent, or Firm—H. D. Gordon

[57] ABSTRACT

A synchronizer assembly (S) having an axially centered neutral recess (13) and on each axial side of the neutral recess a gear engaging recess (22, 23) is provided. The gear engaging recesses (22, 23) are selectively engageable by a radially outwardly biased detent member (14) mounted in a strut (3) to minimize the tendency of the detent member from causing undue wear to the synchronizer assembly when the synchronizer assembly is in a gear engaging position. Preferably, the gear engaging recesses (22, 23) are shallower than the neutral recess (13).

6 Claims, 2 Drawing Sheets

ENGAGED POSITION

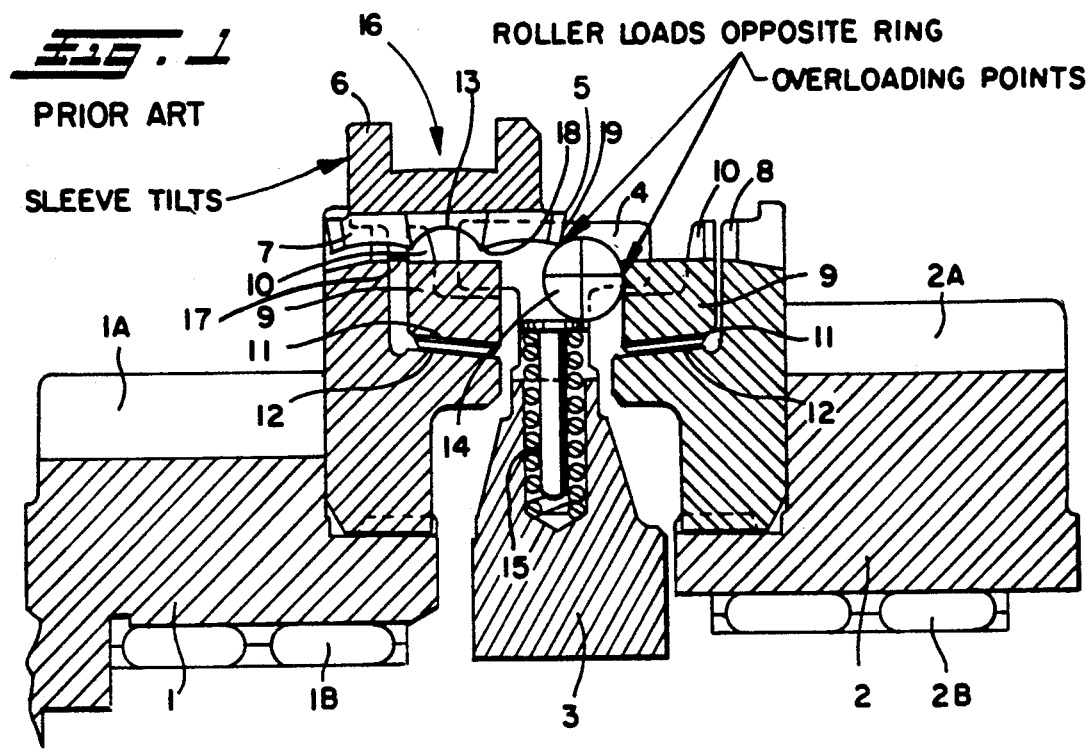
Fig. 1 PRIOR ART
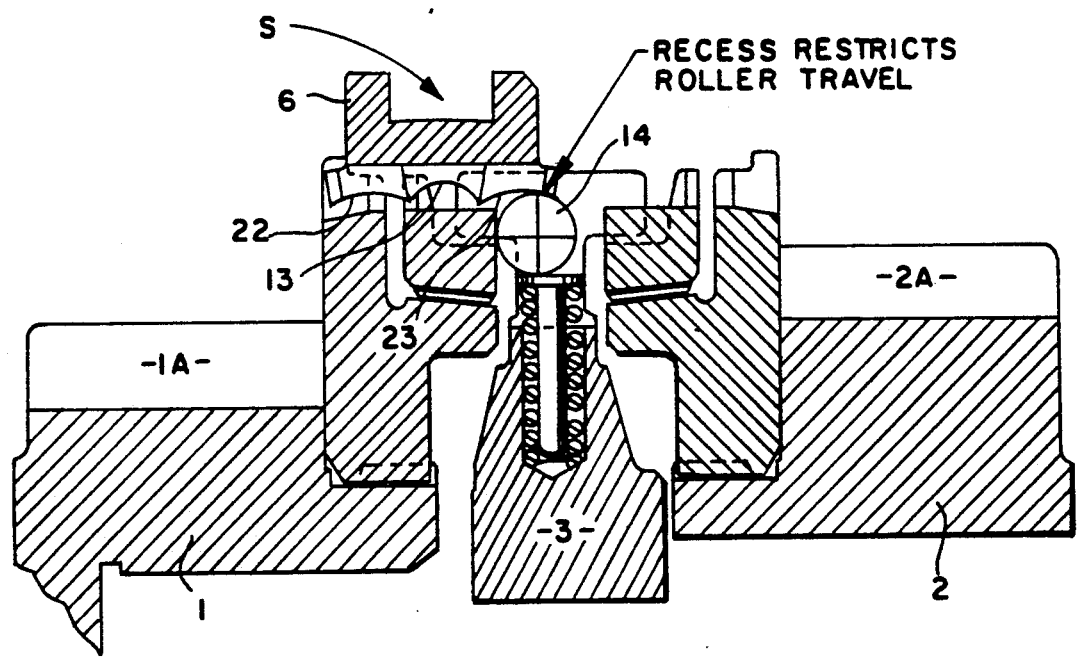
ENGAGED POSITION Fig. 2

NEUTRAL POSITION

SYNCHRONIZER SLIDING CLUTCH SLEEVE

RELATED APPLICATIONS

This application claims priority from British Application No. 9107771.9 filed Apr. 12, 1991.

BACKGROUND OF THE INVENTION

1. Field of the Invention

The present invention relates to "strut" or "baulking ring" type synchronizers for synchronized change gear transmissions. In particular, the present invention relates to an improved sliding clutch sleeve/dent mechanism for strut type synchronizers.

2. Description of the Prior Art

Fully or partially synchronized change gear transmissions for automobiles and for trucks are well known in the prior art as may be seen by reference to U.S. Pat. Nos. 4,989,706; 5,069,079; 4,754,665; 4,569,252; 4,502,346; 4,432,251 and 4,428,469, the disclosures of which are incorporated herein by reference.

Double acting so-called "strut" or "baulking ring" type synchronizer jaw clutch assemblies wherein a sliding clutch member is axially displaceable in either axial direction from an axially centered position to engage a selected one of two selectable gears to a shaft are well known in the prior art as may be seen by reference to U.S. Pat. Nos. 4,185,725 and 4,059,178 and published U.K. Patent Application No. 2,029,519A, the disclosures of all of which are incorporated herein by reference.

Generally, strut type synchronizers include a sliding clutch member or sleeve carrying a set of jaw clutch teeth and rotationally fixed to a shaft which sleeve is selectively axially displaceable from a neutral or nonengaged position to positively engage a complementary set of jaw clutch teeth rotationally fixed to a gear thereby to rotationally couple the gear to the shaft. Typically a baulking ring is interposed the clutch teeth of the sliding clutch sleeve and the selected gear to prevent or block axial movement of the clutch sleeve into an engaging position until substantially synchronous conditions exist. A pair of friction surfaces (usually conical) associated with the shaft (usually with the baulking ring) and the gear are provided to cause synchronous conditions as the clutch sleeve is urged toward engagement with the selected gear. The axial force urging the friction surfaces into engagement is typically generated by the baulking ring as it blocks axial movement of the sliding clutch sleeve in sensed nonsynchronous conditions.

In synchronized clutch assemblies of this type, especially in double acting clutch assemblies, it is desirable to provide a detent for the clutch sleeve sliding movement between the two gear engagement positions, so that an intermediate neutral position can be stably found. Typically, the sleeve when in a position corresponding to neutral, or when passing through neutral, presents a radially inwardly facing neutral defining recess to a nominally axially fixed radially outwardly sprung rolling detent member which tends to spring into the neutral recess, but when not in neutral, the sleeve presents a more or less smooth surface thereof to ride axially over the rolling member, revolving it. The latter must be free to roll, and it must have radial freedom to enter the neutral recess. Unfortunately it is therefore prone also to some axial freedom which, though small, can be undesirable.

A problem is that the rolling member (roller or ball) can escape from under the clutch sleeve when the sleeve has been fully slid in one or the other axial direction for engaging a gear. This problem is enhanced by the fact that the sleeve must have some tilting freedom, so that its clutch teeth or splines can always enter gaps in the clutch teeth or splines of the gears. The tilting can facilitate escape of the roller, which can prejudicially load or even wear other clutch components. The present invention aims to avoid escape of the rolling member without encouraging tilting of the sleeve.

SUMMARY OF THE INVENTION

In accordance with the present invention, the drawbacks of the prior art are minimized or overcome by the provision of an improved sleeve recess structure for cooperation with the radially outwardly biased neutral detent roller or similar member which will minimize the tendency of the detent member to escape from under the sleeve while not unduly encouraging tilting of the sleeve. According to the present invention, the sleeve carries at least one additional recess axially on each side of the neutral detent recess, to stably seat the sprung rolling member whenever either gear associated with that sleeve is engaged.

The neutral detent recess is provided not to prevent escape of the roller, but has the quite different function of enabling the driver to feel when he is passing through neutral where he may want to stop or to shift across a gate to other gear of the gear pair engageable by the double acting synchronizer assembly.

Accordingly, it is an object of the present invention to provide a strut type synchronizer assembly wherein the sliding clutch member has an improved detent recess structure to prevent escape of the detent member in the fully engaged positions of the sleeve without encouraging undue tilting of the sleeve.

This and other objects and advantages of the present invention will become apparent from the detailed description of the preferred embodiment taken with reference to FIGS. 1, 2 and 3, all of which show a circumferential fragment of a section through a synchronized transmission showing two mainshaft gears, the mainshaft and a double acting strut type synchronized jaw clutch assembly.

BRIEF DESCRIPTION OF THE DRAWINGS

FIG. 1 shows a prior art arrangement and one of the problems arising therefrom.

FIGS. 2 and 3 show the preferred embodiment of the present invention respectively in the in gear and the in neutral positions thereof.

DESCRIPTION OF THE PREFERRED EMBODIMENT

Figure 2:
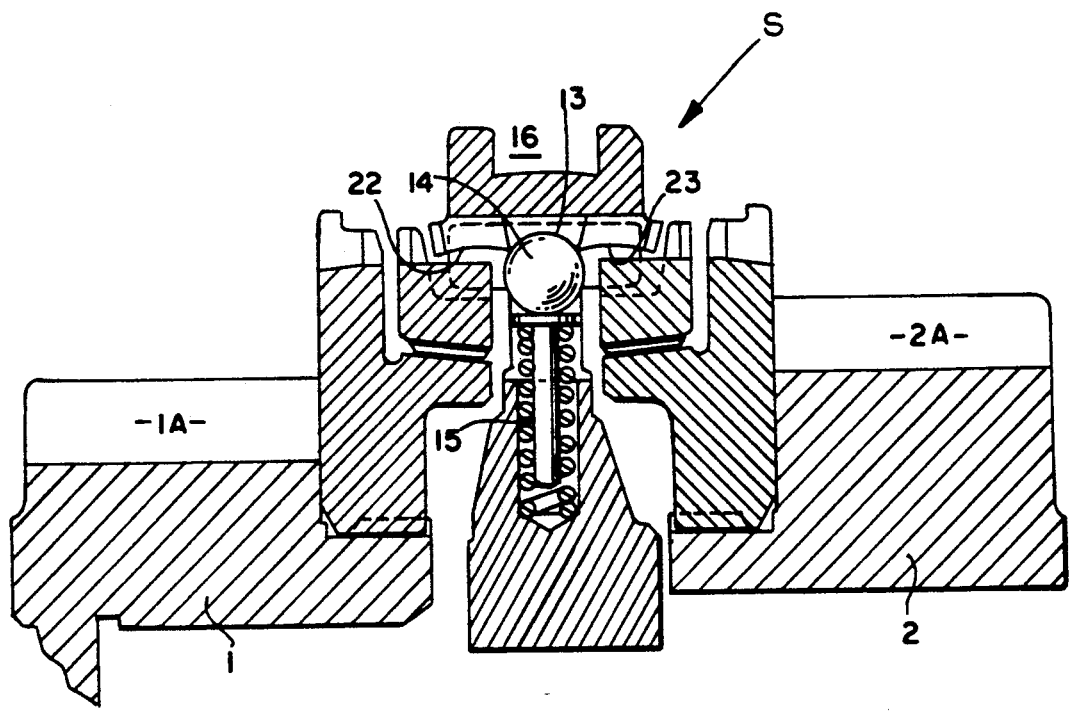

Certain terminology will be used in the following description for convenience and reference only and will not be limiting. The words "upwardly", "downwardly", "rightwardly" and "leftwardly" will designate directions in the drawings to which reference is made. The words "inwardly", and "outwardly", refer to directions towards and away from, respectively, the geometric center of the device and designated parts thereof. The above applies to the words above specifically mentioned, derivatives thereof and words of similar import.

A prior art double acting strut type synchronized jaw clutch assembly for a synchronized transmission is illustrated in FIG. 1. Synchronized jaw clutch assemblies of this general type are well known in the prior art as may be seen by reference to above-mentioned U.S. Pat. Nos. 4,185,725 and 4,059,178 and published U.K. Patent Application GB 2,029,519A.

It is noted that much of the structure illustrated in FIG. 1 is structurally and functionally identical or substantially identical to the preferred embodiment (FIGS. 2 and 3) of the present invention and, for such elements, common reference numerals will be used in the description and the drawings.

Referring to FIG. 1, a first and a second main shaft gear, 1 and 2, have teeth 1A and 2A, respectively are in constant mesh with countershaft gears (not shown) and are rotatably supported on the transmission mainshaft, represented by the center line C/L, usually by needle bearings 1B and 2B respectively. A selected one of gear 1 or gear 2 is rotationally fixed to the mainshaft, i.e., is engaged, only when hub or strut 3 which is rotationally fixed to the mainshaft, usually by a spline connection, is coupled to the selected gear. To this end, strut 3 has external splines 4 thereon which are adapted to be coupled with internal splines 5 on a sliding clutch sleeve 6 which will rotationally fix the clutch sleeve 6 to the strut 3 and the main shaft while allowing axial movement therebetween. Sliding splined connections of this type are, of course, well known in the prior art.

The internal splines 5 on the sliding clutch sleeve are clutchingly engageable to splines 7 or 8, respectively, provided on the gears 1 and 2, respectively. The internal spline teeth 5 on sliding clutch 6 and the external spline teeth 7 and 8 on the gears 1 and 2, respectively, function both as splines and as axially engageable jaw clutch teeth in a manner well known in the prior art and the leading edges of the splines/clutch teeth are preferably provided with tapered or rounded surfaces to ease engagement of the teeth and minimize tooth butting conditions.

By way of example, when gear 1 is to be engaged, sleeve 6 is slid leftwardly as viewed, from a central or neutral position such as shown in FIG. 2 to the position shown in FIG. 1. A synchronizer or bulking ring 9 has complementary external splines or teeth 10 or the like that will engage spline teeth 5 allowing axial movement of the sleeve leftwardly for engagement of jaw clutch teeth 7 or will block axial movement of spline teeth 5 if a nonsynchronous condition is sensed between the mainshaft and the selected main shaft gear. When a substantially nonsynchronous condition is sensed, the bulking ring will engage the leading edges of spline teeth 5 of the sliding clutch 6 to block further axial movement thereof and axial forces asserted upon the sliding clutch 6 will move the bulking ring 9 leftwardly so that the conical friction surface 11 on the bulking ring axially engages a corresponding conical friction surface 12 on the gear thereby causing the gear rotational speed to be increased or decreased to a speed substantially equal to the rotational speed of the main shaft before splines 5 are allowed to pass through the baulking ring and move into engagement with the clutch teeth 7 on the selected gear. Alternatively, analogous synchronizing occurs when a rightward sleeve movement to engage gear 2 has been selected. Sliding clutch sleeve 6 is moved axially rightwardly or leftwardly relative to the mainshaft by means of a shift fork or the like (not shown) which engages a slot 16 provided in the clutch sleeve.

A radially inwardly opening axially central recess 13 in the clutch sleeve 6 provides the usual neutral detent recess, giving a notching feeling to the driver, and relatively stable positioning in neutral, because a detent member or roller 14 is urged radially outwardly into a seating position within recess 13 by a coil compression spring 15. This is seen better in FIG. 3 since FIG. 1 illustrates a gear engaging condition. It is noted that the detent members are often of a wedge shape cross section as well as an circular cross section as illustrated in the preferred embodiment.

Referring again to FIG. 1, clutch sleeve 6 has tilted slightly radially inwardly at its leftmost end, probably due to a leftward force on the slot 16 rotating the sleeve counterclockwise about the splines 5. This assists the tendency of the roller 14 to escape to the right, assisted by spring 15, whenever the relatively smooth inner diameter surfaces 17 and 18 of the sliding clutch sleeve 6 on each side of the neutral detent cavity 13 are axially spaced as illustrated in FIG. 1. This escape, or movement to the right out of alignment with the coil spring 15, does not effect the gear engagement of gear 1, to the left, but does load the opposite synchronizing ring 9 and flange 19 of the sleeve to the right, which will cause the conical friction surfaces 11 and 12 associated with the mainshaft gear 2 to come into frictional axial engagement. This loading wastes energy, can cause helical scoring on the flange 19, and can cause wear on the friction surfaces as well as the hardened roller member 14.

To avoid or minimize the problem discussed above the preferred embodiment of the present invention, as illustrated in FIGS. 2 and 3, is provided. According to the present invention, spherical or cylindrical recesses or depresses 22 and 23, as shown in FIGS. 2 and 3, on each side of the neutral recess 13 are provided. As a matter of preference, the preferred embodiment provides that the additional radially inwardly opening recesses 22 and 23 be as shallow as possible, consistent with preventing escape of the roller member 14, in order to allow easy shifting out of gears. Of course, these recesses could be deeper, if it were thought advisable for any reason to provide a resilient resistance to intentional and/or unintentional shift movements out of gear engagement.

As may be seen by reference to FIG. 3, the additional recesses 22 and 23 have absolutely no effect on the function and operation of the double acting synchronizer assembly when that assembly is in the axially centered or neutral position. Referring to FIG. 2, which illustrate the synchronizer assembly with the sliding clutch sleeve fully axially displaced leftwardly for engagement of gear 1, it may be seen that the recess 23 located axially rightwardly of the neutral detent recess 13 will prevent rightward escape of the roller 14 while not increasing the tendency of the sliding clutch sleeve 6 to tilt radially inwardly at the leftward end thereof. The generally arcuate neutral detent recess 13 has a depth equal to at least 30% of the diameter of detent member 14 while the adjacent recesses 22 and 23 have a depth no greater than 50% as great as that of the neutral recess detent.

It will be appreciated that the present invention may be applied equally to automatic, and partially automatic as well as manual shifting transmissions.

Accordingly, it may be seen that a new and improved synchronized jaw clutch assembly of the strut type has been provided by the relatively simple and inexpensive provision of one or more recesses, preferably relatively shallow recesses, axially adjacent the preexisting neutral detent recess 13 in the inner diameter surface of the sliding clutch sleeve 6.

The description of the preferred embodiment of the present invention is by way of example only. Various modifications and/or rearrangement of the parts are contemplated without departing from the scope and spirit of the invention as hereinafter claimed.

I claim:

1. A strut type synchronizer assembly (S) for a drivetrain device including a shaft (C/L), at least one clutchable member (1,2) rotationally supported on the shaft and selectively rotationally coupled to and uncoupled from said shaft, a strut member (3) rotationally fixed to said shaft axially adjacent said clutchable member and extending radially outwardly from said shaft, a sliding clutch member (6) rotationally fixed to said strut member and axially movable relative thereto from a neutral nondisplaced position (FIG. 3) to an axially displaced engagement position (FIG. 2), said sliding clutch member carrying clutch teeth engageable with clutch teeth carried by said clutchable member when said sliding clutch member is in the displaced engagement position thereof and a detent member (14) associated with said strut member and biased radially outwardly from said strut member for engagement with a radially inwardly opening neutral detent recess (13) provided in a radially inwardly facing surface of said sliding clutch member when said sliding clutch member is in the nondisplaced neutral position thereof, said detent member defining a generally circular cross section of known diameter on a plane containing the axis of rotation of said shaft and bisecting said detent member, and said neutral detent recess generally arcuate in shape and having a maximum depth at least 30% as great as said known diameter said synchronizer assembly characterized by:

at least one engagement recess (22, 23) in said radially inwardly facing surface of said sliding clutch member axially adjacent said neutral recess for receipt of said detent member when said sliding clutch member is in the displaced position thereof, the maximum depth of said engagement recess being no greater than 50% of the maximum depth of said neutral detent recess.

2. The synchronizer assembly of claim 1 wherein said drivetrain device is a multi-speed change gear transmission, said shaft is a transmission main shaft and said clutchable member is a main shaft gear.

3. The synchronizer assembly of claim 2 additionally comprising a second main shaft gear selectively coupled to and uncoupled from said transmission main shaft, and wherein said strut member is axially interposed between said first and second main shaft gear and said slidable clutch member is displaceable from said nondisplaced position in a first axial direction to a first displaced position for engagement of said first mainshaft gear to said mainshaft and displaceable in a second axial direction opposite said first axial direction from said nondisplaced position to a second displaced position for coupling said second main shaft gear to said main shaft.

4. The synchronizer assembly of claim 2 further comprises baulking ring means (9) for blocking axial displacement of said sliding clutch member to the fully displaced position thereof in the absence of substantially synchronous conditions.

5. The synchronizer assembly of claim 3 further comprises baulking ring means (9) for blocking axial displacement of said sliding clutch member to the fully displaced position thereof in the absence of substantially synchronous conditions.

6. The synchronizer assembly of claim 1 wherein said strut member is provided with axially extending external splines (4) for splined engagement with internal splines (5) carried by said sliding clutch member, said internal splines carried by said sliding clutch member defining said clutch teeth carried by said sliding clutch member.

* * * * *